United States Patent
Ichimura (10) Patent No.: US 9,746,924 B2
(45) Date of Patent: Aug. 29, 2017

(54) ELECTRONIC DEVICE, METHOD FOR CONTROLLING ELECTRONIC DEVICE, AND RECORDING MEDIUM

(71) Applicant: NEC CASIO Mobile Communications, Ltd., Kawasaki-shi, Kanagawa (JP)

(72) Inventor: Shigehiro Ichimura, Kawasaki (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/426,021

(22) PCT Filed: Jun. 28, 2013

(86) PCT No.: PCT/JP2013/067901
§ 371 (c)(1),
(2) Date: Mar. 4, 2015

(87) PCT Pub. No.: WO2014/041870
PCT Pub. Date: Mar. 20, 2014

(65) Prior Publication Data
US 2015/0346821 A1    Dec. 3, 2015

(30) Foreign Application Priority Data

Sep. 11, 2012 (JP) .................................. 2012-199762

(51) Int. Cl.
| | |
|---|---|
| *G09G 5/00* | (2006.01) |
| *G06F 3/01* | (2006.01) |
| *G06F 3/0488* | (2013.01) |
| *H04M 1/725* | (2006.01) |
| *H04M 19/04* | (2006.01) |

(52) U.S. Cl.
CPC ............ *G06F 3/016* (2013.01); *G06F 3/0488* (2013.01); *H04M 1/72547* (2013.01); *H04M 19/04* (2013.01)

(58) Field of Classification Search
CPC .. G06F 2203/041; G06F 3/0416; G06F 3/016; G06F 3/0488
(Continued)

(56) References Cited

U.S. PATENT DOCUMENTS 7,424,272 B2* 9/2008 Horiguchi ........... H04M 1/0214
455/415
9,110,529 B2* 8/2015 Kido ........................ G06F 3/01
(Continued)

FOREIGN PATENT DOCUMENTS

| CN | 101193149 A | 6/2008 |
|---|---|---|
| EP | 2138927 A2 | 12/2009 |

(Continued)

OTHER PUBLICATIONS

Extended European Search Report for EP Application No. EP 13836619.0 dated Apr. 25, 2016.
(Continued)

*Primary Examiner* — Jennifer Nguyen (57) ABSTRACT

A portable terminal device (10) includes a touch panel display (12) which displays information such as character strings, vibration setting information (16c) which stores character strings and vibration patterns in association with each other, a control unit (15) which recognizes an image displayed on the touch panel display (12) as a character string, and a vibration generating unit (14) which generates vibration in a particular vibration pattern. The control unit (15) determines a character string from among a displayed image, obtains a pattern of vibration corresponding to the determined character string referring to the vibration setting information (16c), and causes the vibration generating unit (14) to generate vibration in the obtained vibration pattern.

7 Claims, 10 Drawing Sheets

(58) Field of Classification Search
USPC .......................................... 345/156, 168, 173
See application file for complete search history.

(56) References Cited

U.S. PATENT DOCUMENTS

| | | | |
|---|---|---|---|
| 2009/0325645 A1 | 12/2009 | Bang et al. | |
| 2011/0095986 A1* | 4/2011 | Aono .................... | G06F 3/0233 345/168 |
| 2012/0155678 A1 | 6/2012 | Liu et al. | |
| 2012/0206248 A1 | 8/2012 | Biggs | |
| 2012/0249461 A1* | 10/2012 | Flanagan .............. | G06F 1/1694 345/173 |
| 2013/0227409 A1* | 8/2013 | Das ........................ | H04L 51/32 715/702 |
| 2014/0009380 A1* | 1/2014 | Kim ...................... | G06F 1/1613 345/156 |

FOREIGN PATENT DOCUMENTS

| | | |
|---|---|---|
| JP | H09307631 A | 11/1997 |
| JP | H09-330199 A | 12/1997 |
| JP | 2000148393 A | 5/2000 |
| JP | 2002149312 A | 5/2002 |
| JP | 2008-122507 A | 5/2008 |
| JP | 2009-131740 A | 6/2009 |
| JP | 2009211393 A | 9/2009 |
| WO | 2012/026076 A1 | 3/2012 |

OTHER PUBLICATIONS

International Search Report for PCT Application No. PCT/JP2013/067901, mailed on Jul. 30, 2013.
Chinese Office Action for CN Application No. 201380047062.1 dated on Jun. 14, 2016 with English Translation.
Chinese Office Action for CN Application No. 201380047062.1 dated on Feb. 20, 2017 with English Translation.
"ViBe—Caller ID App with Different Vibration Patterns for Callers", Disabled World, Published Nov. 10, 2011 (Rev. Sep. 16, 2012), XP55368220. URL: https://www.disabled-world.com/assistivedevices/apps/vibe.php.
Extended European Search Report for EP Application No. EP13836619.0 dated May 11, 2017.

* cited by examiner

TELEPHONE DIRECTORY DATA

| TELEPHONE NO | MAIL ADDRESS | NAME | VIBRATION PATTERN |
|---|---|---|---|
| 03-1234-5678 | itiro@biglobe.co.jp | YAMADA ICHIRO | VIBRATION PATTERN 1 |
| 044-9876-5432 | jiro@biglobe.org.jp | OKAWA JIRO | VIBRATION PATTERN 2 |
| 06-3333-2222 | sab@biglobe.biz.jp | KAWABATA SABURO | VIBRATION PATTERN 3 |
| 080-3939-8888 | siro@biglobe.com | MACHINAKA SHIRO | VIBRATION PATTERN 4 |

ELECTRONIC DEVICE, METHOD FOR CONTROLLING ELECTRONIC DEVICE, AND RECORDING MEDIUM

This application is a National Stage Entry of PCT/JP2013/067901 filed on Jun. 28, 2013, which claims priority from Japanese Patent Application 2012-199762 filed on Sep. 11, 2012, the contents of all of which are incorporated herein by reference, in their entirety.

TECHNICAL FIELD

The present invention relates to an electronic device for generating vibration, a method for controlling an electronic device, and a recording medium.

BACKGROUND ART

A vibrator is mounted on a portable phone. A variety of a notification is conveyed to a user of the portable phone by vibrations generated by the vibrator. The vibrator can generate characteristic vibrations different for each type of a notification. For example, a vibration pattern of the vibrator for notifying reception of electronic mails can be made different from a vibration pattern of the vibrator for notifying reception of telephone calls.

There is disclosed in Patent Literature 1 a portable terminal device capable of notifying a called party that a call is received from a particular person. This portable terminal device generates vibration by switching over vibration patterns as a result of comparison between telephone number of calling party and telephone numbers registered beforehand. By this method, the portable terminal device can notify the called party that the call is received from a particular party.

In general, a plurality of applications such as a short message service application, an electronic mail application, and a telephone application are installed on a portable terminal device. In this type of portable terminal device, the individual settings for each of applications for registering telephone numbers of originators and vibration patterns corresponding to these telephone numbers are necessary, wherefore setting works get complicated. A similar problem exists not only in vibration for an incoming call notification, but also in a variety of vibration set individually.

CITATION LIST

Patent Literature

[PTL 1] Japanese Laid-open Patent Publication No. 9-307631

SUMMARY OF INVENTION

Technical Problem

The present invention has been developed in consideration of the aforementioned actual situations, and has an object to provide an electronic device, a control method of an electronic device, and a recording medium that are capable of generating vibration of an arbitrary vibration pattern without depending upon applications being used, and without complicated setting work.

Solution to Problem

An electronic device according to a first aspect of the present invention includes:

a vibration generating unit that generates vibration;
a display memory that stores display data;
a display unit that displays information corresponding to the display data stored in the display memory;
a memory unit that stores character data and vibration patterns indicating patterns of the vibration in association with each other; and
a control unit that recognizes the display data stored in the display memory as character data, obtains a vibration pattern corresponding to the recognized character data from the memory unit, and vibrates the vibration generating unit in the obtained vibration pattern.

A control method of an electronic device according to a second aspect of the present invention includes:

a step for storing display data in a display memory;
a step for displaying information corresponding to the display data stored in the display memory; and
a step for recognizing the stored display data as character data, obtaining a vibration pattern corresponding to the recognized character data based on a correlation between the character data and the vibration pattern stored beforehand, and generating vibration in the obtained vibration pattern.

A non-transitory recording medium recording a program that causes a computer to execute:

a process for storing display data in a display memory;
a process for displaying information corresponding to the display data stored in the display memory;
a process for recognizing the stored display data as character data, obtaining a vibration pattern corresponding to the recognized character data based on a correlation between the character data and the vibration pattern stored beforehand, and generating vibration in the obtained vibration pattern.

Advantageous Effects of Invention

According to the present invention, vibration can be generated in vibration patterns different for each displayed character data without depending upon applications being used, and without complicated setting work.

DESCRIPTION OF EMBODIMENTS

An electronic device according to exemplary embodiments of the present invention is hereinafter described referring to the accompanying drawings. The exemplary embodiments will be described using a portable terminal device as an example.

First Exemplary Embodiment

Figure 1:
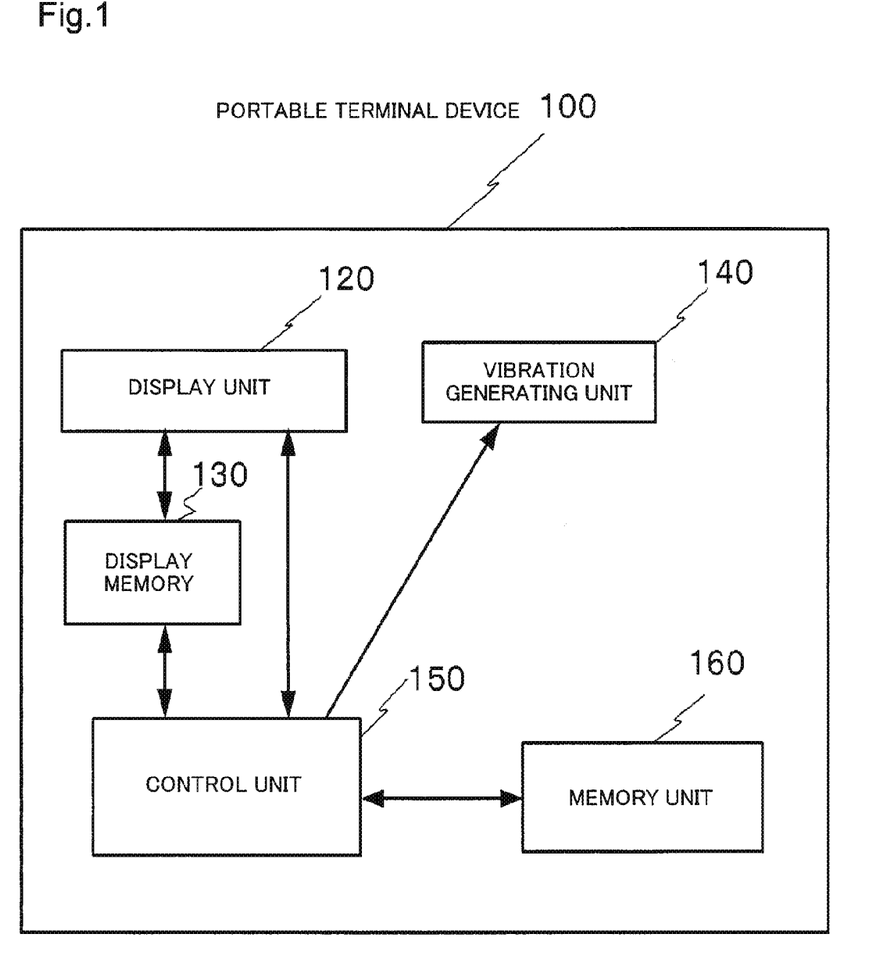
FIG. 1 is a block diagram of a portable terminal device according to a first exemplary embodiment of the present invention.

As illustrated in FIG. 1, a portable terminal device 100 according to a first exemplary embodiment includes a display unit 120, a display memory 130, a vibration generating unit 140, a control unit 150, and a memory unit 160.

The display unit 120 is a device that has a function of displaying information such as images and characters on a screen.

The display memory 130 contains a memory area where image data (display data) for displaying information on the screen of the display unit 120 is loaded in bitmap format or the like. The display memory 130 stores display data in this memory area. The display unit 120 displays information corresponding to display data that is loaded, i.e. stored, in the display memory 130.

The vibration generating unit 140 generates vibration of a variety of vibration patterns.

The control unit 150 includes a CPU (Central Processing Unit) or DSP (Digital Signal Processor), and an internal memory from the physical viewpoint. The internal memory temporarily stores OS (Operating System) programs, application programs and the like to be executed by the CPU. The internal memory also stores a variety of data for processing performed by the CPU. The OS is a multitask OS capable of executing a plurality of application programs simultaneously (in parallel).

The control unit 150 reads and executes programs stored in the memory unit 160 to control the display unit 120, the display memory 130, the vibration generating unit 140, and the memory unit 160 that are the respective elements of the portable terminal device 100.

The memory unit 160 is constituted by devices such as a ROM (Read Only Memory), and a RAM (Random Access Memory) from the physical viewpoint. The memory unit 160 stores the not-shown OS (Operating System), a variety of application programs, and the like. The memory unit 160 also stores arbitrary character strings (character data) in association with vibration patterns. In other words, the memory unit 160 also stores information on vibration patterns set beforehand and associated with character strings. The vibration patterns in this context represent patterns of vibration.

The control unit 150 reads the application programs from the memory device 160 to store the application programs in the internal memory, and the programs stored in the internal memory are read and executed by the CPU of the control unit 150. A variety of processing is executed in this manner. The control unit 150 stores display data in the display memory 130 in the course of execution of the application programs to cause the display unit 120 to display a variety of images as information. The control unit 150 also reads a character string recognition program from the memory device 160 to store the character string recognition program in the internal memory in parallel with execution of the application programs, and reads the program stored in the internal memory in the CPU of the control unit 150 to be executed. By execution of the character string recognition program, the control unit 150 recognizes the display data stored in the display memory 130 as a character string. Moreover, the control unit 150 obtains a vibration pattern corresponding to the recognized character string from the memory unit 160. Furthermore, the control unit 150 vibrates the vibration generating unit 140 in the obtained vibration pattern.

According to this configuration, the control unit 150 recognizes a character string in the display data stored in the display memory 130, and vibrates the vibration generating unit 140 in a vibration pattern corresponding to the character string. As a result, the user can confirm that the vibration thus generated is related to the character string. Accordingly, vibration can be generated in such vibration patterns as different for each displayed character data, common to a plurality of application programs, and not requiring complicated setting work. According to the present invention, therefore, vibration patterns can be allocated to respective character strings without depending upon applications to be used.

Second Exemplary Embodiment

Figure 2:
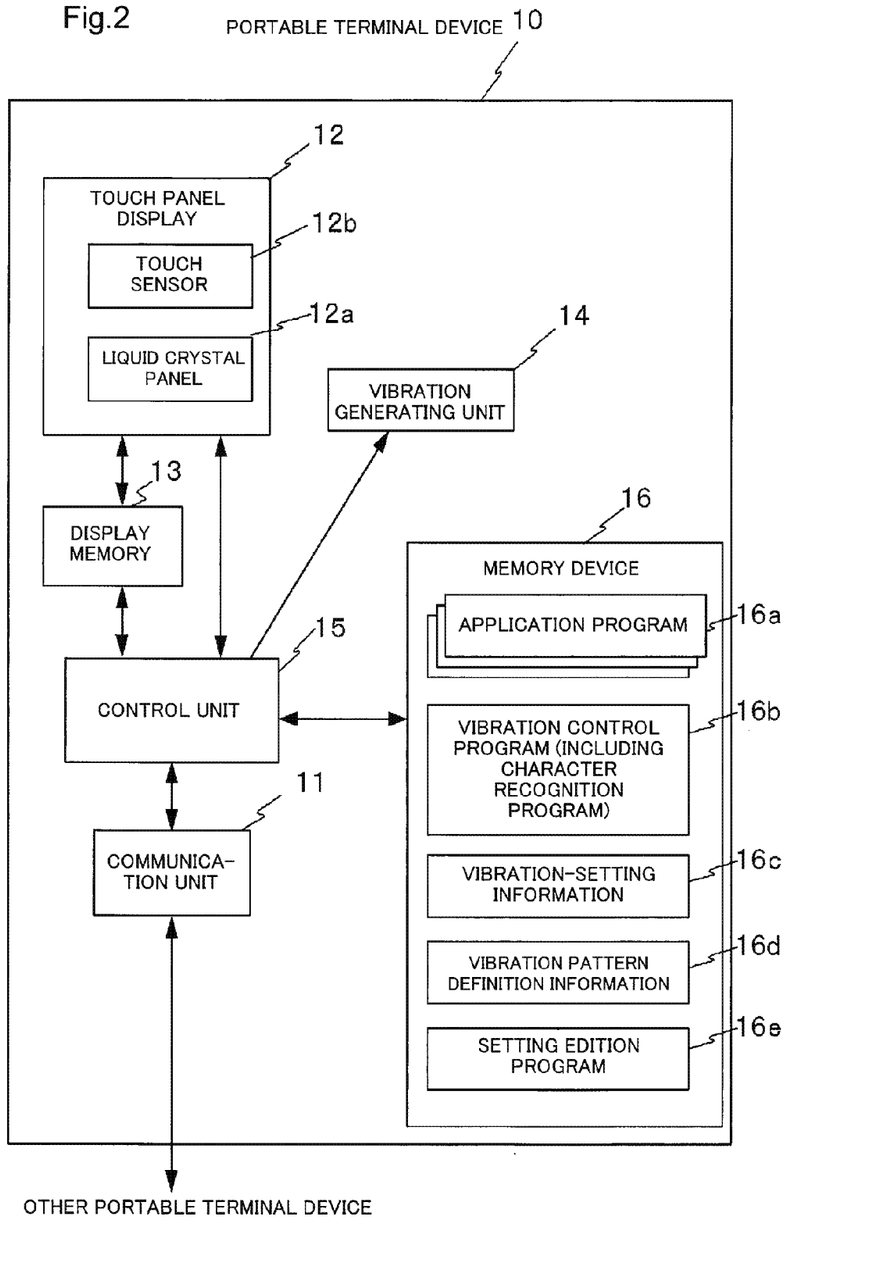
FIG. 2 is a block diagram of a portable terminal device according to a second exemplary embodiment of the present invention.

As illustrated in FIG. 2, a portable terminal device 10 according to a second exemplary embodiment includes a communication unit 11, a touch panel display 12, a display memory 13, a vibration generating unit 14, a control unit 15, and a memory device 16.

The communication unit 11 has a function of communicating with other portable terminal devices via a base station and a communication network. The communication unit 11 includes an antenna for transmitting and receiving wireless signals to and from the base station, and a transmission and reception circuit that performs transmitting and receiving processing of wireless signals to and from the base station.

The touch panel display 12 corresponds to the display unit 120 in the first exemplary embodiment. The touch panel display 12 is a device that has a function of displaying information such as images, and characters on a screen, and a function of detecting a touch position by a user who has touched the screen and outputting a signal for indicating the recognized position.

For realizing these functions, the touch panel display 12 includes a liquid crystal panel 12a, and a touch sensor 12b. The liquid crystal panel 12a displays on screen information such as images, and characters loaded, i.e., stored, in the display memory 13. The touch sensor 12b detects the fact of being touched, and the touch position. The liquid crystal panel 12a and the touch sensor 12b are overlapped with each other. The touch sensor 12b is disposed on the screen of the liquid crystal panel 12a. The touch sensor 12b is transparent, wherefore a display image of the liquid crystal panel 12a can be viewed through the touch sensor 12b. The touch sensor 12b detects the touch position by the user, and transmits the recognized position to the control unit 15.

The display memory 13 corresponds to the display memory 130 in the first exemplary embodiment. The display memory 13 includes a memory area where image data (display data) for displaying information on the screen of the liquid crystal panel 12a is loaded in bitmap format or the like. The display memory 13 stores display data in this memory area. The liquid crystal panel 12a displays information corresponding to display data loaded, i.e., stored, in the display memory 13.

The vibration generating unit 14 corresponds to the vibration generating unit 140 in the first exemplary embodiment. The vibration generating unit 14 includes a vibrator capable of generating a variety of vibration. The vibration generating unit 14 generates vibration of a variety of vibration patterns by using this vibrator. The vibration generated by the vibration generating unit 14 includes sound produced by aerial vibration other than mechanical vibration. In other words, the vibration generating unit 14 includes means for generating sound that is aerial vibration.

The control unit 15 corresponds to the control unit 150 in the first exemplary embodiment. The control unit 15 includes a CPU or a DSP, and an internal memory from the physical viewpoint. At least a part of programs of OS (Operating System) and application programs to be executed by the CPU are temporarily stored in the internal memory. A variety of data necessary for processing by the CPU are also stored in the internal memory.

The control unit 15 controls the touch panel display 12, the display memory 13, the vibration generating unit 14, and the memory device 16 that are respective elements of the portable terminal device 10 by reading and executing programs stored in the memory device 16.

The memory device 16 corresponds to the memory unit 160 in the first exemplary embodiment. The memory device 16 is constituted by devices such as a ROM, and a RAM from the physical viewpoint. The memory device 16 stores the not-shown OS (Operating System), a variety of application programs 16a, a vibration control program 16b for controlling vibration of the vibration generating unit 14, or the like. Types of application programs may be arbitrary as long as the application programs 16a can display and select character strings. The vibration control program 16b vibrates the vibration generating unit 14 according to any one of a plurality of vibration patterns set beforehand. The vibration control program 16b includes a character recognition program. The character string recognition program is a program that converts dot (bit) pattern data of a character loaded in the display memory 13 into character codes. The character string recognition program may be software such as an optical character recognition (OCR) program, for example.

In addition, the memory device 16 further stores vibration-setting information 16c, vibration pattern definition information 16d, and setting edition program 16e.

Figure 3:
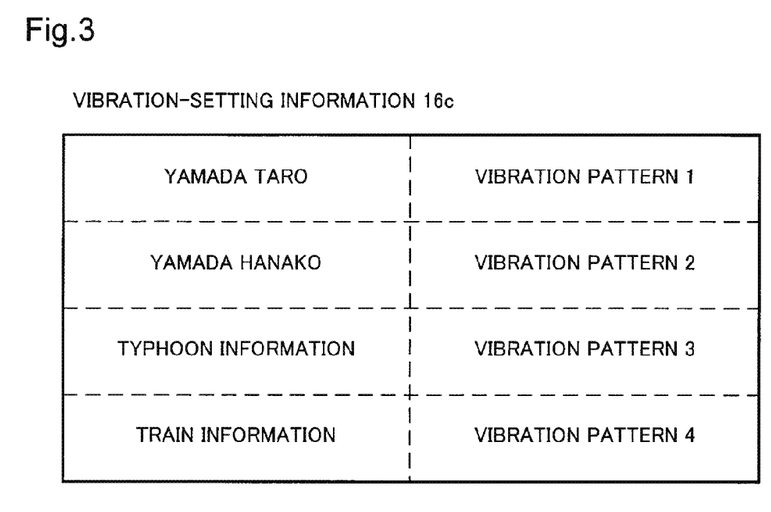
FIG. 3 is a diagram illustrating vibration-setting information of the portable terminal device illustrated in FIG. 2.

As illustrated in FIG. 3, the vibration-setting information 16c is information by which arbitrary character strings such as sender (originator) names and information names are associated with vibration patterns set beforehand.

The vibration pattern definition information 16d is information for defining a plurality of vibration patterns beforehand. The information for defining respective vibration pattern contains changes of the number of vibrations (frequency) with elapses of time t, changes of amplitude with elapses of time, changes of vibration waveform, time intervals of respective vibrations, and the number of times of vibrations, or the like, for example.

The setting edition program 16e is a program that edits (adds, processes, and deletes) the vibration-setting information 16c and the vibration pattern definition information 16d.

The control unit 15 reads the application programs 16a from the memory device 16 to store the read application programs 16a in the internal memory, and reads the programs stored in the internal memory by the CPU to be executed. A variety of processing is executed in this manner. The control unit 15 stores display data in the display memory 13 in the course of execution of a variety of processing to load a variety of images as information and to cause the images to be displayed on the liquid crystal panel 12a. The control unit 15 executes a plurality of application programs 16a to load display data as an image for each of the application programs, and to cause the display memory 13 to store the image. The control unit 15 also reads the vibration control program 16b from the memory device 16 to store the vibration control program 16b in the internal memory in parallel with execution of the application programs 16a, and reads the program stored in the internal memory by the CPU to be executed. By execution of the vibration control program 16b, the control unit 15 recognizes a character string at a touch position by analyzing pixel patterns on the display memory 13 when a character string displayed on the liquid crystal panel 12a is touched by the user using the finger and a stylus or the like. Further, the control unit 15 obtains a vibration pattern corresponding to the recognized character string from the vibration-setting information 16c. Furthermore, the control unit 15 vibrates the vibration generating unit 14 by the obtained vibration pattern. The control unit 15 controls the display position so that the position of a character, a character string, or an image displayed at the touch position may not overlap with the positions of display images of icons or shortcuts that are to be triggers for start of the application programs.

The control unit 15 also reads the setting edition program 16e from the memory device 16 to store the read setting edition program 16e in the internal memory in response to an instruction from the touch panel display 12 of a user, and reads the program stored in the internal memory by the CPU to be executed. By execution of the setting edition program 16e, the control unit 15 edits the vibration-setting information 16c illustrated in FIG. 3 adds new combinations of character strings and vibration patterns, delete combinations, and change combinations of character strings and vibration patterns. One vibration pattern corresponding to one character string is selected from among the vibration patterns set beforehand in the vibration pattern definition information 16d. The control unit 15 also adds and deletes vibration patterns to and from the vibration pattern definition information 16d, and changes and modifies vibration patterns in the vibration pattern definition information 16d by executing the setting edition program 16e.

The portable terminal device 10 includes a signal processing unit for processing voices or the like, a microphone, and a speaker in addition to the foregoing elements. The signal processing unit converts signals received via the communication unit 11 and the control unit 15 into electric signals corresponding to voices or the like. The speaker outputs voices corresponding to the converted electric signals. The microphone converts input voices or the like into electric signals. The signal processing unit converts electric signals input from the microphone into transmission signals to be transmitted to a portable terminal device of the transmission destination via the control unit 15 and the communication unit 11.

Figure 5:
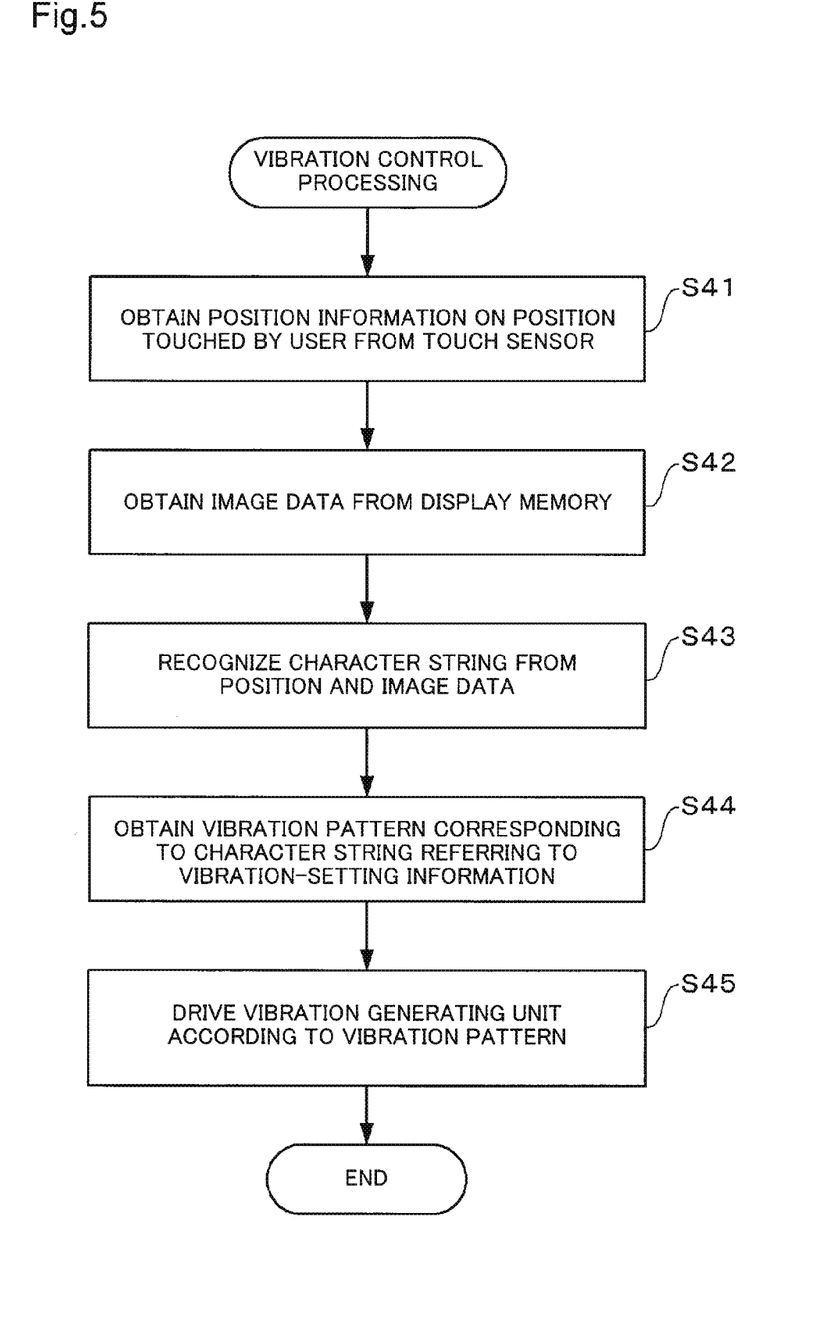
FIG. 5 is a flowchart describing a vibration control processing performed by a control unit of the portable terminal device illustrated in FIG. 1.

Next, the operation of the portable terminal device 10, centering on the operation of the control unit 15, is described referring to FIG. 5.

For easy understanding, it is assumed that four character strings, and vibration patterns corresponding to the respective character strings as illustrated in FIG. 3 are set in the memory device 16 as the vibration-setting information 16c. According to the example illustrated in the figure, in the vibration-setting information 16c, "Vibration Pattern 1", "Vibration Pattern 2", "Vibration Pattern 3", and "Vibration Pattern 4" are assigned respectively for four character strings of "Yamada Taro", "Yamada Hanako", "Typhoon Information", and "Train Information".

When the power source of the portable terminal device 10 is set to be in a power-on state by the user, the control unit 15 displays icons for starting the respective application programs 16a mounted on the touch panel display 12.

The control unit 15 executes the vibration control program 16b in a background, for example.

Figure 4:
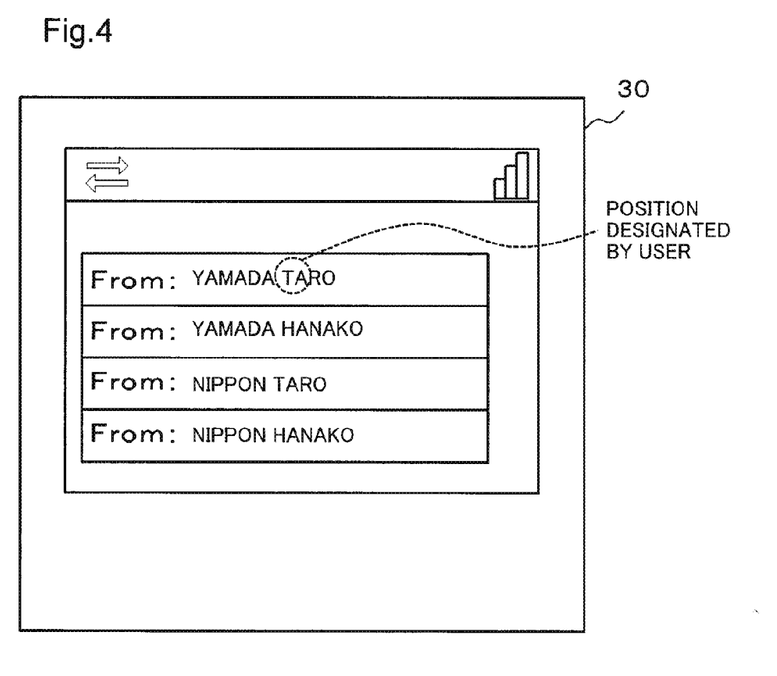
FIG. 4 is a display example of a window on a screen of the portable terminal device illustrated in FIG. 2.

The user touches one of the displayed icons, an icon of a mailer for electronic mails, for example, to start the corresponding application program. Further, the user operates an icon such as a list of received mails. When the operation is executed, the control unit 15 displays a window indicating a list of senders of electronic mails received from other portable terminal devices as illustrated in FIG. 4 on the screen of the liquid crystal panel 12a. According to the example illustrated in the figure, a name list of senders of four electronic mails ("Yamada Taro", "Yamada Hanako", "Nippon Taro", and "Nippon Hanako") is displayed within the window.

Assuming that the user touches an arbitrary position on a screen 30 of the liquid crystal panel 12a, such as "Ta" of "Yamada Taro" in the sender names displayed on the screen 30 illustrated in FIG. 4 by using the finger of the user or a stylus pen, the touch sensor 12b of the touch panel display 12 detects the position touched and designated by the user, and outputs position information on the recognized position to the control unit 15. In response to this operation, the control unit 15 executes processing such as displaying the electronic mail corresponding to the selected position.

On the other hand, the control unit 15 starts a vibration control processing illustrated in FIG. 5 in a background in parallel with operation for opening the mail or the like in response to a touch operation. In the vibration control processing, the control unit 15 initially obtains the position (position information) designated by the user (step S41).

Next, the control unit 15 obtains an image (image data) of the position and a periphery of the position from the display memory 13 based on the obtained position (step S42). Subsequently, the control unit 15 executes a character recognition processing from the bit pattern of the obtained image to recognize the character string at the position touched by the user and the periphery of the position, i.e., "Yamada Taro" illustrated in FIG. 4 (step S43).

The control unit 15 searches for the character string that corresponds with the recognized character string "Yamada Taro" referring to the vibration-setting information 16c, and obtains the vibration pattern corresponding to the corresponded character string, i.e., the "Vibration Pattern 1" illustrated in FIG. 3 (step S44).

Next, the control unit 15 drives the vibration generating unit 14 according to the obtained vibration pattern (foregoing "Vibration Pattern 1") (step S45). In more detail, the control unit 15 outputs a driving signal for vibrating the vibration generating unit 14 to the vibration generating unit 14. As a result, the vibration generating unit 14 vibrates in the specified vibration pattern.

According to this configuration, the portable terminal device 10 vibrates in a vibration pattern corresponding to the character string when a displayed character string is touched. Accordingly, the user can confirm the character string personally touched by vibration. Moreover, when there is a touch, a dot pattern loaded on the display memory 13 is recognized as a character string, and a corresponding vibration pattern is specified. Accordingly, a vibration pattern common to a plurality of application programs 16a can be allocated to each of the character strings.

In the first exemplary embodiment, an example is shown in which the user designates a character displayed on the screen of the touch panel display 12 by touching the corresponding character, but a character string or an image as well as a character may be touched and designated.

While a touch panel is used for designating a character, an input device such as a mouse may be connected with the portable terminal device so that a character, a character string, or an image may be designated by shifting a cursor on the screen. Incidentally, a character string may be designated by designating a start point and an end point of the character string by a touch or the like. Moreover, words or a series of sentences containing a portion of character designated by a touch or the like may be determined as a character string. Words or a series of sentences to be determined may be registered as character strings beforehand. In this case, known determination technique may be employed for determining the words and the series of sentences.

Third Exemplary Embodiment

In the second exemplary embodiment, the control unit 15 recognizes a character string displayed at a touch position touched by the user and the periphery thereof, and generates vibration. However, this invention is not limited to this example.

This invention is also applicable to a situation or the like in which a sender is automatically determined at the time of reception of a mail or a telephone call to generate a vibration in a vibration pattern corresponding to the sender, for example.

An exemplary embodiment corresponding to this example is hereinafter described. In the exemplary embodiment, the application programs 16a include an electronic mail program and a telephone program.

Figure 6A:
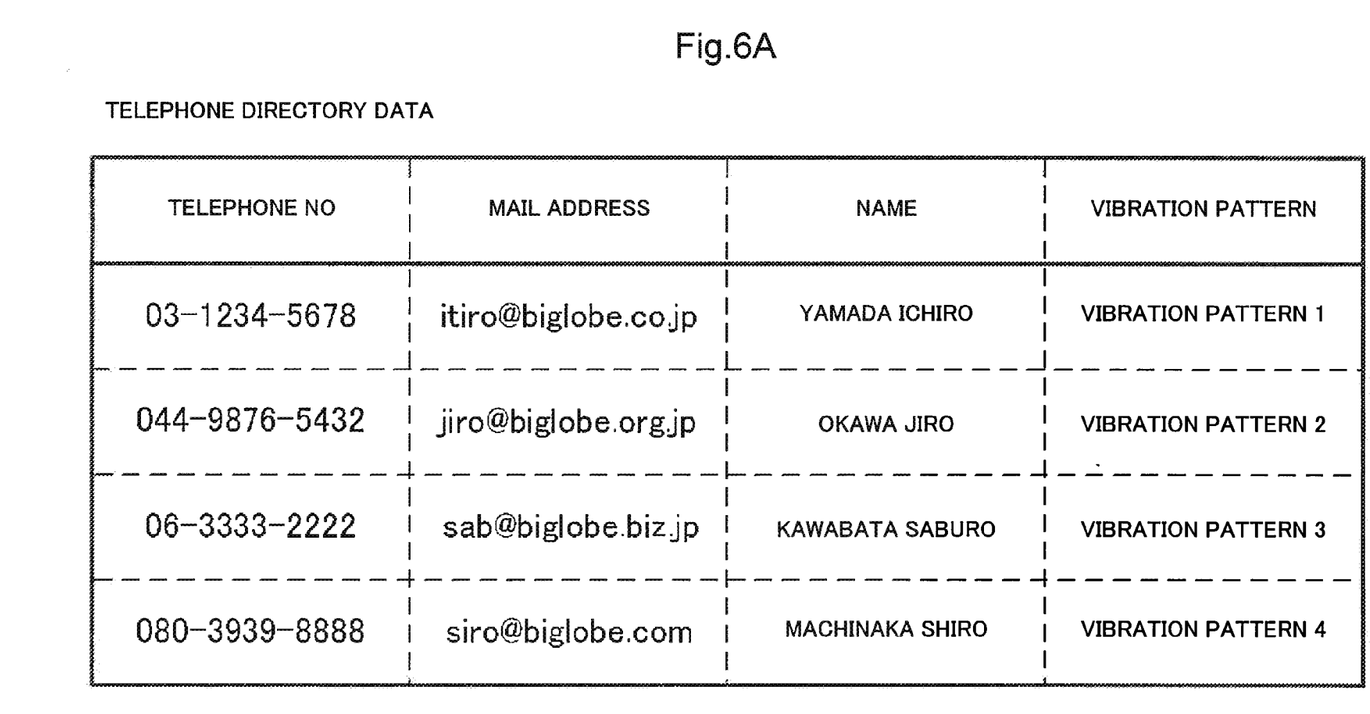
FIG. 6A is a diagram illustrating telephone directory data provided by a memory device of a portable terminal device according to a third exemplary embodiment of the present invention.

Moreover, the memory device 16 includes telephone directory data illustrated in FIG. 6A by way of example. As illustrated in FIG. 6A, telephone numbers, electronic mail addresses, names of senders, and vibration patterns are associated with each other, and stored in the telephone directory data.

When receiving a telephone call, the control unit 15 starts the telephone program, and specifies the telephone number of the originator or the name of the originator. Further, the control unit 15 causes the display memory 13 to store the specified information, and causes the liquid crystal panel 12a to display the specified information. Similarly, when receiving a mail, the control unit 15 starts the mailer program, and specifies the name of the sender from the mail address of the sender referring to the telephone directory data. Further, the control unit 15 causes the display memory 13 to store the specified information, and displays the specified information on the liquid crystal panel 12a.

For example, when determining that a telephone call has been received from a telephone number "03-1234-5678", the control unit 15 specifies that the originator is "Yamada Ichiro" referring to the telephone directory data. The control unit 15 causes the display memory 13 to store the character string data of "Yamada Ichiro" so specified, and causes the liquid crystal panel 12b to display the character string data. Similarly, when determining that a mail has been received from "jiro@biglobe.org.jp", the control unit 15 specifies that the sender is "Yamada Jiro" referring to the telephone directory data. The control unit 15 causes the display memory 13 to store the character string data of "Yamada Jiro" so specified, and causes the liquid crystal panel 12b to display the character string data.

Figure 6B:
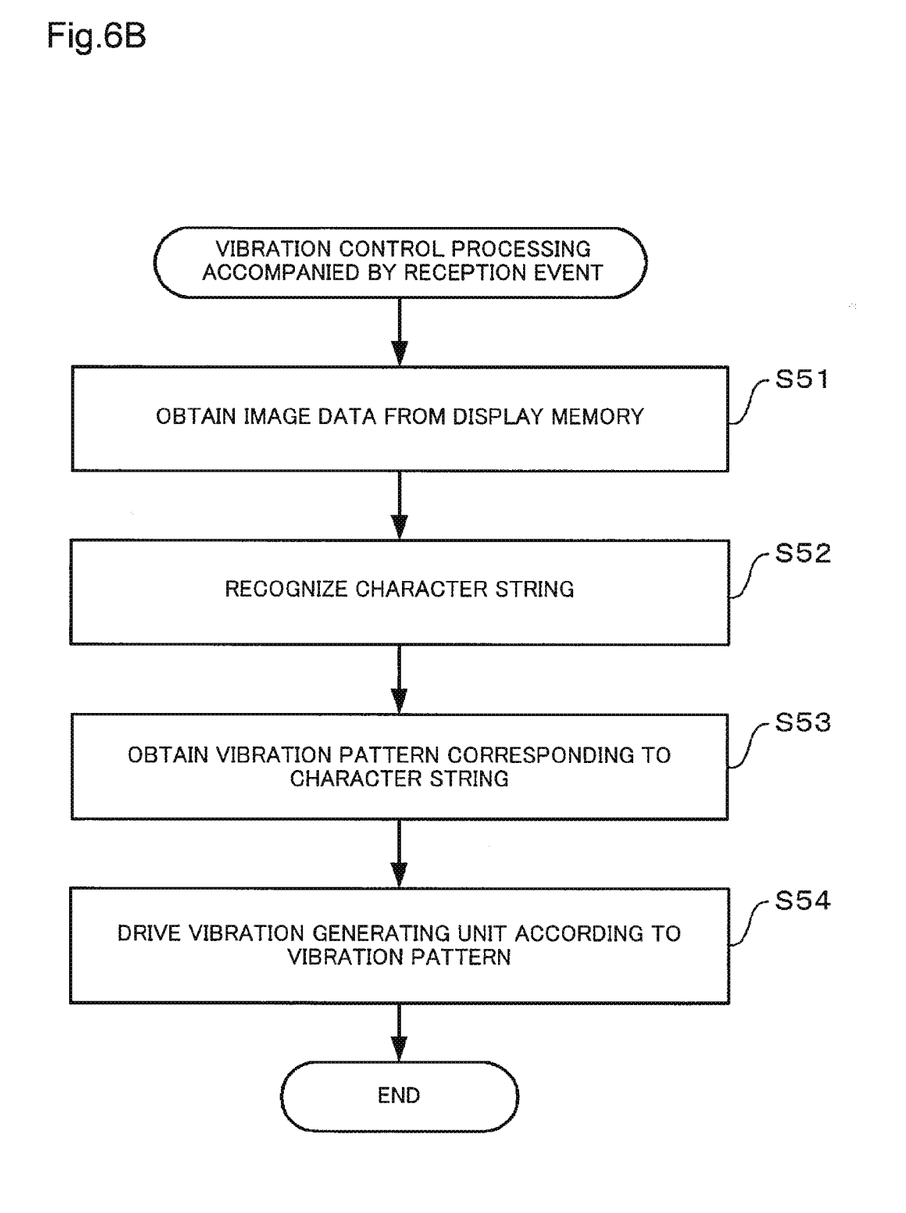
FIG. 6B is a flowchart describing a vibration control processing performed by a control unit of the portable terminal device according to the third exemplary embodiment of the present invention.

On the other hand, the control unit 15 starts a vibration control processing illustrated in FIG. 6B in a background in parallel with the foregoing operation or the like. In the vibration control processing, the control unit 15 obtains an image (image data) from the display memory 13 (step S51). Subsequently, the control unit 15 executes a character recognition processing from the bit pattern of the obtained image to detect a character string (step S52).

The control unit 15 obtains a vibration pattern associated with the recognized character string referring to the telephone directory data (step S53).

The control unit 15 drives the vibration generating unit according to the vibration pattern (step S54). In detail, the control unit 15 outputs to the vibration generating unit 14 a driving signal for vibrating the vibration generating unit 14 in the obtained vibration pattern. As a result, the vibration generating unit 14 vibrates in the obtained vibration pattern.

Accordingly, when receiving a telephone call from the telephone number "03-1234-5678", for example, vibration in the vibration pattern 1 is generated. On the other hand, when receiving a mail from "jiro@biglobe.org.jp", vibration in the vibration pattern 2 is generated.

The user of the portable terminal device 10 can determine from the vibration whom the reception has been originated from.

According to this configuration, notification vibration patterns can be set for each sender regardless of the types of applications 16a.

Notification sound patterns may be stored in addition to vibration patterns or instead of vibration, and notification sounds corresponding to recognized character strings can be emitted from the speaker.

Fourth Exemplary Embodiment

The portable terminal device 10 according to the first exemplary embodiment requires the user to start the setting edition program 16e, to operate the touch panel display 12 personally, and to set the vibration-setting information 16c. This invention is not limited to this example, but a setting method is arbitrary.

A portable terminal device for which a user as an originator (sender) can set vibration patterns will be hereinafter described.

Figure 7:
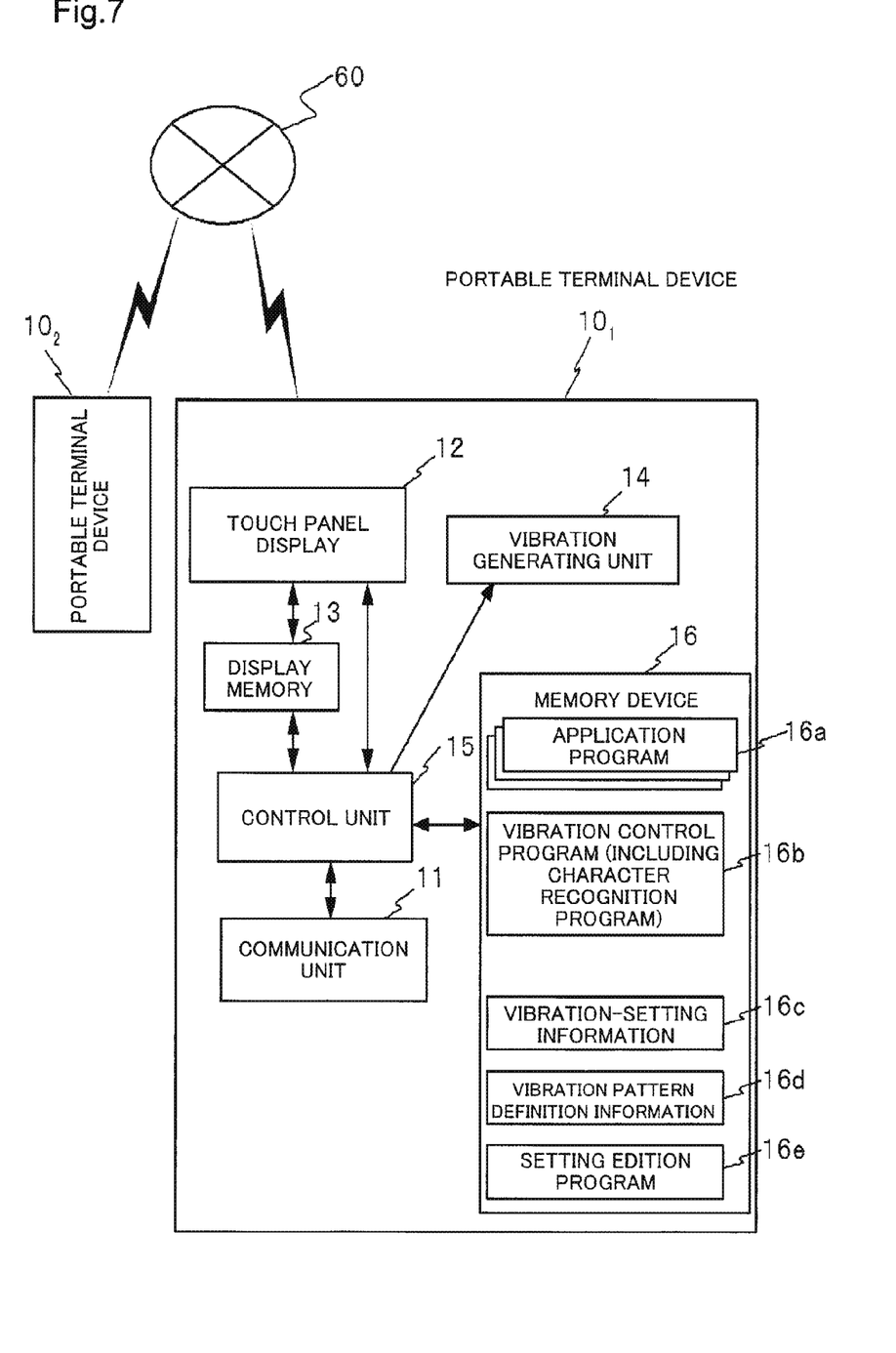
FIG. 7 is a block diagram of a portable terminal device according to a fourth exemplary embodiment of the present invention.
Figure 8:
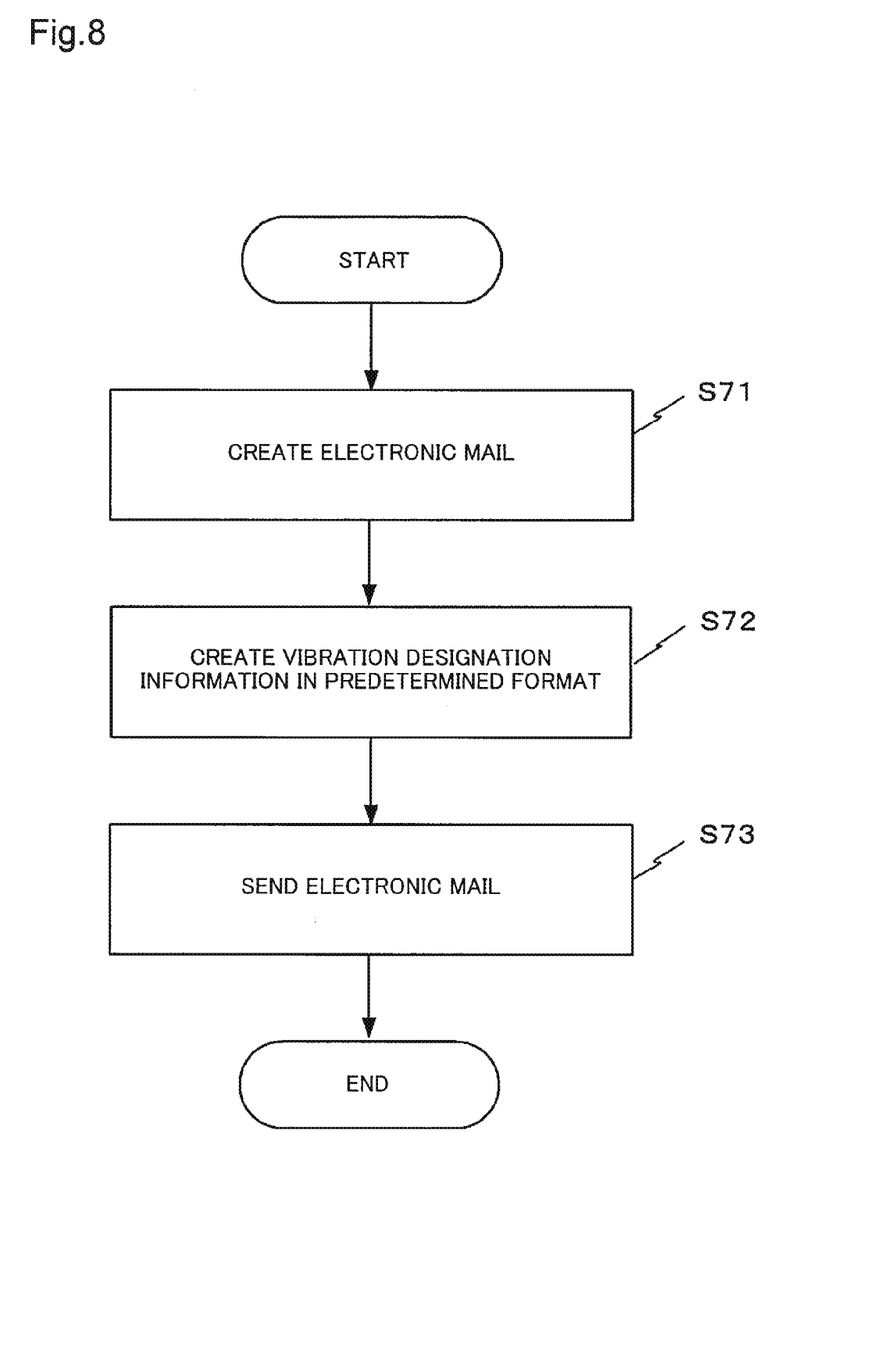
FIG. 8 is a flowchart describing an operation example when a user of the portable terminal device illustrated in FIG. 7 personally sets vibration patterns in sending an electronic mail to another portable terminal device.

Referring to FIG. 8, an operation example will be described when a user of a portable terminal device $10_1$ illustrated in FIG. 7 sends an electronic mail to a portable terminal device $10_2$, and personally sets a vibration pattern for this sending.

The user operates the touch panel display 12, and starts the mailer program from among a plurality of application programs 16a. After the start of the mailer program, the control unit 15 creates an electronic mail according to operation input by the user (step S71).

After creation of the electronic mail, the control unit 15 creates vibration designation information in a predetermined format (step S72). The control unit 15 creates information indicating a character string and a vibration pattern as vibration designation information in a format determined beforehand in the title or body of the electronic mail. For example, when registering "Yamada Ichiro" and "Vibration Pattern 2" in the vibration-setting information 16c, information such as "Yamada Ichiro: 2" is created as vibration-setting information.

In response to an instruction of "send", the control unit 15 sends the created electronic mail from the communication unit 11 to the portable terminal device $10_2$ via a network 60 (step S73).

Figure 9A:
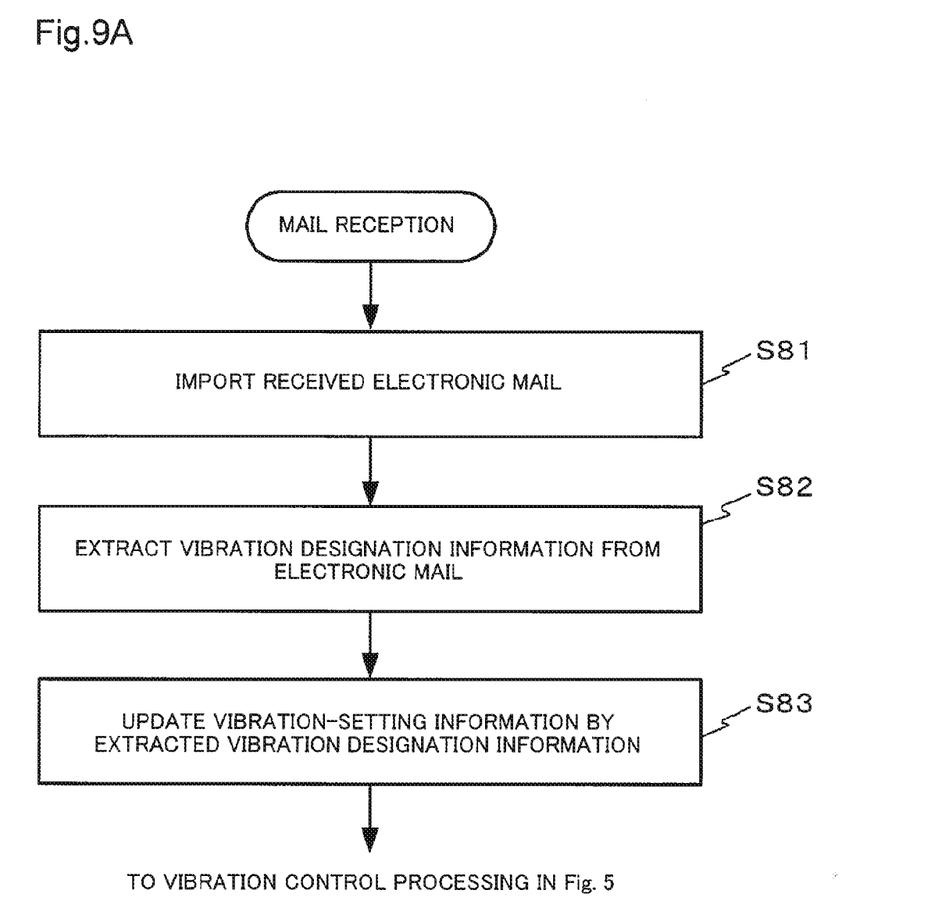
FIG. 9A is a flowchart describing an operation example of the portable terminal device that received an electronic mail.

Next, an operation of the portable terminal device $10_2$ having received an electronic mail is described referring to FIG. 9A.

When the mailer program is started in the portable terminal device $10_2$, the control unit 15 imports the received electronic mail (step S81). In this example, a list of received electronic mails is displayed on the liquid crystal display panel 12a as illustrated in FIG. 4 by way of example.

At this time, the edition program searches the title and body of the mail to determine whether or not designation information in a predetermined format is contained therein, and extracts vibration designation information in a predetermined format, when designation information in a predetermined format is found (step S82). Next, the control unit 15 updates the vibration setting-information 16c by the extracted vibration designation information (step S83).

The following operation is identical to the operation of the portable terminal device 10 according to the second exemplary embodiment (vibration control processing illustrated in FIG. 5).

According to this configuration, the sender of the mail can personally designate vibration for notifying selection and reception of its own mail.

When the presence of designation information in a predetermined format is determined at the time of reception of a mail, the vibration designation information 16c is updated. Thereafter, the reception notification process is executed so that vibration for reception notification may be generated in the vibration pattern designated by the sender.

Figure 9B:
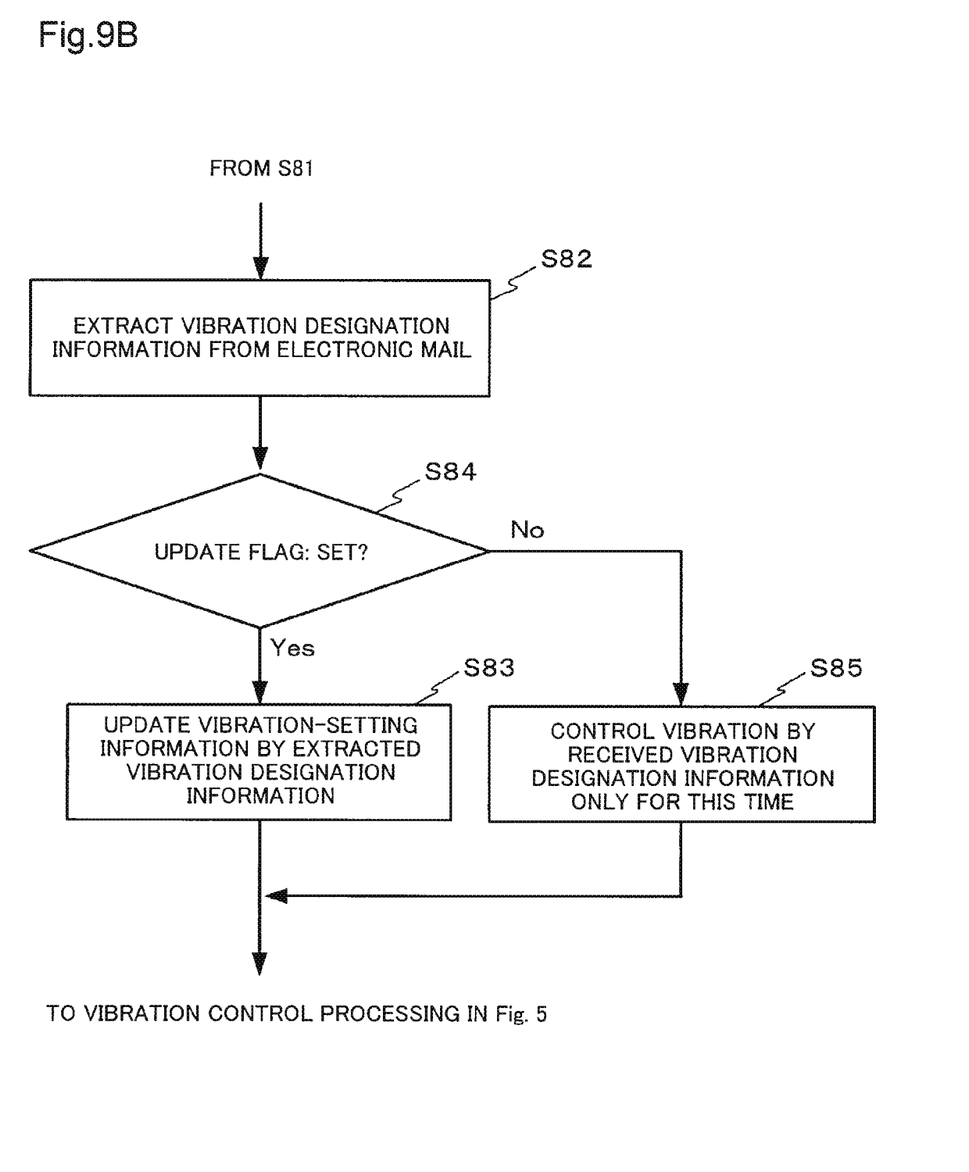
FIG. 9B is a flowchart describing a modified example of an operation example of the portable terminal device that received an electronic mail.

In addition, the control unit 15 may operate as illustrated in FIG. 9B. As illustrated in FIG. 9B, the control unit 15 extracts vibration designation information from the electronic mail (step S82) after execution of step S81 as mentioned above. The vibration designation information contains update designation information (update flag) for designating whether or not the vibration designation information 16c is updated. Subsequently, the control unit 15 determines whether or not the update flag is set, i.e., whether or not the update designation information is designating "update" (step S84). When the update designation information is designating "update" (step S84: Yes), the control unit 15 updates the vibration-setting information 16c from the extracted vibration designation information (step S83). On the other hand, when the update designation information does not designate "update" (step S84: No), the control unit 15 controls so that vibration may be generated by the received vibration designation information, i.e., by a mode designated by the mail only for the receiving processing this time (step S85).

In the third exemplary embodiment, an example is shown in which vibration designation information is transmitted by an electronic mail, and vibration designation information may not be limited to be transmitted by an electronic mail, but by a short message, an instant message or the like, for example, as long as necessary information can be transmitted thereby.

The touch sensor may be any one of a projection type electrostatic capacitance system touch panel, a surface type electrostatic capacitance system touch panel, an inner type electrostatic capacitance system touch panel, or the like. The touch sensor may not be limited to a touch panel mentioned hereinabove as long as the control unit 15 can determine a character string or the like designated by the user on the screen.

Further, the touch sensor or the like may be either a contact detection type for detecting contact, or a proximity detection type for detecting proximity.

The electronic device according to the present invention is described by an example applied to a portable terminal device such as a portable phone and a PHS (Personal Handy-phone System). However, the electronic device according to the present invention is also applicable to a game machine, a tablet PC (Personal Computer), a notebook PC, and the like other than a portable information terminal such as a PDA (personal Data Assistant), a portable compact electronic device such as a smart phone.

The touch panel display 12 may be used as an input unit of information communication device such as a bank ATM, an automatic ticket vending machine, a POS (Point of Sale) terminal, a game machine, a tablet PC, and a notebook PC other than a portable compact electronic device such as a smart phone.

In the foregoing exemplary embodiments, programs to be executed may be stored in a computer-readable recording medium such as a flexible disc, a CD-ROM (Compact Disc Read-Only Memory), a DVD (Digital Versatile Disc), and an MO (Magneto-Optical Disc) to be distributed, so as to constitute a system for executing the foregoing programs by installing the program.

Moreover, the programs may be stored in a disk device or the like contained in a predetermined server device on a communication network such as the internet, and downloaded from the disk device or the like by superimposing on carrier waves, for example.

When the foregoing functions are shared and realized by an OS (Operating System), or are realized by collaboration between the OS and applications, only the part other than the OS may be stored in the medium and distributed, or may be downloaded.

This invention is not limited to the exemplary embodiments described above, but may be modified and applied variously.

In other words, a variety of exemplary embodiments and modifications are made possible according to this invention without departing from the spirit of this invention in a broad sense and the scope of this invention. Further, the foregoing exemplary embodiments are for the purpose of explanation of this invention, and do not limit the scope of this invention. In other words, the scope of this invention is shown not by the exemplary embodiments but by the claims. It is considered that a variety of modifications made within the scope of the claims and within the scope of significance of the invention equivalent to the claims be all contained in the scope of this invention.

A part or the whole of the foregoing exemplary embodiments may be described as in the following supplementary notes, but is not limited to these notes.

Supplementary Note 1

An electronic device comprising:
a vibration generating unit that generates vibration;
a display memory that stores display data;
a display unit that displays information corresponding to the display data stored in the display memory;
a memory unit that stores character data and vibration patterns indicating patterns of the vibration in association with each other; and
a control unit that recognizes the display data stored in the display memory as character data, obtains a vibration pattern corresponding to the recognized character data from the memory unit, and vibrates the vibration generating unit in the obtained vibration pattern.

Supplementary Note 2

The electronic device according to Supplementary Note 1, characterized in that the display data recognized by the control unit as character data is display data contained in the information displayed by the display unit and corresponding to information designated by operation from a user.

Supplementary Note 3

The electronic device according to Supplementary Note 1 or Supplementary Note 2, characterized in that the control unit starts a corresponding application program in response to reception, causes the display memory to store character data, and causes the display unit to display the character data.

Supplementary Note 4

The electronic device according to any one of Supplementary Notes 1 to 3, characterized in that the control unit executes plural application programs, loads display data as an image for each of the application programs, and causes the display memory to store the image.

Supplementary Note 5

The electronic device according to any one of Supplementary Notes 1 to 4, characterized in that the display data displayed in the display unit contains data received from another electronic device.

Supplementary Note 6

The electronic device according to any one of Supplementary Notes 1 to 5, characterized in that the control unit controls such that the display position of the display data contained in the display data stored in the memory unit and recognized as character data does not overlap with the display position of an icon or a shortcut corresponding to a trigger for start of an application program.

Supplementary Note 7

The electronic device according to any one of Supplementary Notes 1 to 6, further comprising means for receiving signal from another electronic device,
characterized in that the control unit determines whether or not the received signal contains character data and designation information for designating a vibration pattern, and updates the character data and the vibration pattern corresponding to the character data stored in the memory unit on the basis of the designation information when the control unit determines that the received signal contains the designation information.

Supplementary Note 8

The electronic device according to any one of Supplementary Notes 1 to 7, characterized in that the vibration generating unit contains means for generating sound as aerial vibration.

Supplementary Note 9

A control method of an electronic device characterized by comprising:
 a step for storing display data in a display memory;
 a step for displaying information corresponding to the display data stored in the display memory; and
 a step for recognizing the stored display data as character data, obtaining a vibration pattern corresponding to the recognized character data based on a correlation between the character data and the vibration pattern stored beforehand, and generating vibration in the obtained vibration pattern.

Supplementary Note 10

A non-transitory recording medium recording a program that causes a computer to execute:
 a process for storing display data in a display memory;
 a process for displaying information corresponding to the display data stored in the display memory;
 a process for recognizing the stored display data as character data, obtaining a vibration pattern corresponding to the recognized character data based on a correlation between the character data and the vibration pattern stored beforehand, and generating vibration in the obtained vibration pattern.

This application is based on Japanese Patent Application No. 2012-199762, filed on Sep. 11, 2012. The entirety of the specification, claims, and drawings of Japanese Patent Application No. 2012-199762 are incorporated in this specification as reference.

INDUSTRIAL APPLICABILITY

This invention is suitable for an electronic device such as a portable terminal device.

REFERENCE SIGNS LIST

10, $10_1$, $10_2$, 100 Portable terminal device (electronic device)
11 Communication unit
12 Touch panel display
12a Liquid crystal panel
12b Touch sensor
120 Display unit
13, 130 Display memory
14, 140 Vibration generating unit
15, 150 Control unit
16, 160 Memory device (memory unit)
16a Application program
16b Vibration control program
16c Vibration-setting information
16d Vibration pattern definition information
16e Setting edition program
30 Screen
60 Network

What is claimed is:

1. An electronic device comprising:
 a vibration generator;
 a display memory that stores display data;
 a display that displays information corresponding to the display data stored in the display memory;
 an antenna which receives a signal from another electronic device;
 a unit that stores data included in the received signal in the display memory as the display data;
 a memory that stores character string data and vibration patterns indicating patterns of the vibration in association with each other; and
 a controller that recognizes the display data stored in the display memory as character string data representing a sender of the received signal, obtains a vibration pattern corresponding to the recognized character data from the memory, and vibrates the vibration generator in the obtained vibration pattern that varies according to the sender,
 wherein the controller determines whether or not the received signal contains character string data and designation information that designates a vibration pattern that the sender set, and updates the character string data stored in the memory and the vibration pattern corresponding to the character string data on the basis of the designation information when the controller determines that the received signal contains the designation information,
 wherein the controller executes a plural application programs, loads display data as an image for each of the application programs, and causes the display memory to store the image, and
 wherein the controller executes a character string data recognition program in parallel with execution of the application programs.

2. The electronic device according to claim 1, wherein the controller starts a corresponding application program in response to reception of the signal, causes the display memory to store character string data, and causes the display to display the character string data.

3. The electronic device according to claim 1, wherein the controller controls the display so that the display position of the information corresponding to the display data does not overlap with the display position of an icon or a shortcut corresponding to a trigger for start of an application program.

4. The electronic device according to claim 1, wherein the vibration generator also generates sound.

5. The electronic device according to claim 1, wherein the vibration generator vibrates an entirety of the electronic device.

6. A control method of an electronic device comprising:
 storing display data in a display memory;
 displaying information corresponding to the display data stored in the display memory;
 receiving a signal from another electronic device;
 storing data included in the received signal in the display memory as the display data;
 recognizing the stored display data as character data representing a sender of the received signal, obtaining a vibration pattern corresponding to the recognized character data based on a correlation between the character data and the vibration pattern stored beforehand, and generating vibration in the obtained vibration pattern that varies according to the sender,
 determining whether or not the received signal contains character data and designation information that designates a vibration pattern that the sender set, and updating the character data and the vibration pattern stored beforehand corresponding to the character data on the basis of the designation information when determining that the received signal contains the designation information, executing a plural application programs, loading display data as an image for each of the application programs, and causing the display memory to store the image, and executing a character string data recognition program in parallel with execution of the application programs.

7. A non-transitory recording medium recording a program that causes a computer to execute:
- a process for storing display data in a display memory;
- a process for displaying information corresponding to the display data stored in the display memory;
- a process for receiving a signal from another electronic device;
- a process for storing data included in the received signal in the display memory as the display data;
- a process for recognizing the stored display data as character data representing a sender of the received signal, obtaining a vibration pattern corresponding to the recognized character data based on a correlation between the character data and the vibration pattern stored beforehand, and generating vibration in the obtained vibration pattern that varies according to the sender,
- a process for determining whether or not the received signal contains character data and designation information that designates a vibration pattern that the sender set, and updating the character data and the vibration pattern stored beforehand corresponding to the character data on the basis of the designation information when determining that the received signal contains the designation information,
- a process for executing a plural application programs, loading display data as an image for each of the application programs, and causing the display memory to store the image, and
- a process for executing a character string data recognition program in parallel with execution of the application programs.

* * * * *